United States Patent [19]
Lindem et al.

[11] Patent Number: 5,401,128
[45] Date of Patent: Mar. 28, 1995

[54] OCTAHEDRAL MACHINE WITH A HEXAPODAL TRIANGULAR SERVOSTRUT SECTION

[75] Inventors: Thomas J. Lindem, Rockford, Ill.; Paul A. S. Charles, Larne, Ireland

[73] Assignee: Ingersoll Milling Machine Company, Rockford, Ill.

[21] Appl. No.: 947,819

[22] Filed: Sep. 18, 1992

Related U.S. Application Data

[63] Continuation-in-part of Ser. No. 749,582, Aug. 26, 1991, Pat. No. 5,259,710.

[51] Int. Cl.⁶ ............................ B23R 35/00; B23C 1/12
[52] U.S. Cl. ............................ 409/132; 408/1 R; 408/236; 409/201; 409/235
[58] Field of Search .............. 409/79, 130, 201, 235, 409/211, 216, 232; 408/239, 236, 1 R; 269/73, 309; 29/428, 429, 563; 82/128; 83/552, 549

[56] References Cited

U.S. PATENT DOCUMENTS

| | | |
|---|---|---|
| 629,042 | 7/1899 | Moreton . |
| 2,995,331 | 8/1961 | Stanton .................. 248/163 |
| 3,215,391 | 11/1965 | Storm ..................... 248/396 |
| 3,229,941 | 1/1966 | Suliteanu et al. ....... 248/163 |
| 3,288,421 | 11/1966 | Peterson ................. 248/396 |
| 3,295,224 | 1/1967 | Cappel ..................... 35/12 |
| 3,322,378 | 5/1967 | Thompson ............... 248/13 |
| 3,559,936 | 2/1971 | Guyon ..................... 248/179 |
| 3,577,659 | 5/1971 | Kail ......................... 35/12 |
| 3,952,979 | 4/1976 | Hansen ................... 248/20 |
| 3,955,472 | 5/1976 | Frankiw et al. ......... 90/86 |
| 4,290,239 | 9/1981 | Zimmer ................... 51/126 |
| 4,426,821 | 1/1984 | Moore et al. ........... 52/646 |
| 4,448,832 | 5/1984 | Kidwell ................... 428/113 |
| 4,523,882 | 6/1985 | Hengesbach ........... 408/236 |
| 4,607,578 | 8/1986 | Inoue et al. ............. 108/145 |
| 4,686,800 | 8/1987 | McCormick ............. 52/81 |
| 4,872,291 | 10/1989 | Lindsey ................... 51/166 R |
| 4,988,244 | 1/1991 | Sheldon et al. ......... 409/132 |
| 5,028,180 | 7/1991 | Sheldon et al. ......... 409/201 |

FOREIGN PATENT DOCUMENTS

| | | |
|---|---|---|
| 476279A1 | 3/1992 | European Pat. Off. . |
| 1222538AL | 4/1986 | Russian Federation . |
| 1296401A | 3/1987 | Russian Federation . |
| 1380915A1 | 11/1988 | Russian Federation . |
| WO89/09677 | 10/1989 | WIPO . |

OTHER PUBLICATIONS

Proceedings of the Institute of Mechanical Engineers, 1965-66, vol. 180, Part I, No. 15, "A Platform With Six Degrees of Freedom", D. Stewart, pp. 371–386.

Journal of Mechanisms, Transmissions, and Automation in Design, Jun. 1984, vol. 106 of the Transactions of the ASME, pp. 191-198, "Feasibility Study of A Platform Type of Robotic Manipulators From a Kinematic Viewpoint", by D. C. H. Yang and T. W. Lee.

Literature from the National Physical laboratory, Crown 1987, "Tetraform 1-A Nanoprecision Machine Tool Concept".

Excerpt from the London Sunday Times, Jan. 3, 1988, "Polishing off The Japanese".

Primary Examiner—Z. R. Bilinsky
Attorney, Agent, or Firm—Fitch, Even, Tabin & Flannery

[57] ABSTRACT

In a cutting machine having an octahedral framework, a cutting tool is carried by a servostrut support having a platform mounted on extendable and retractable struts. In order to reduce deflections and to limit transfer of bending moments, from the servostrut support to the other connected support sections of the framework, the six struts are mounted at pivot mounts such as ball joints in a triangular support. Three of the pivotal mounts are positioned in a first triangle and in corners of the triangle support, and the other three struts are positioned in a second larger triangle in the triangular support. The nominal axis of rotation of spindle drive for the cutting tool may be either about nominal horizontal axis, a nominal vertical axis or a nominal 45° axis. Several frameworks may be arranged to define a hollow tunnel with platforms projecting their cutting tools from opposite sides of the transfer tunnel.

2 Claims, 5 Drawing Sheets

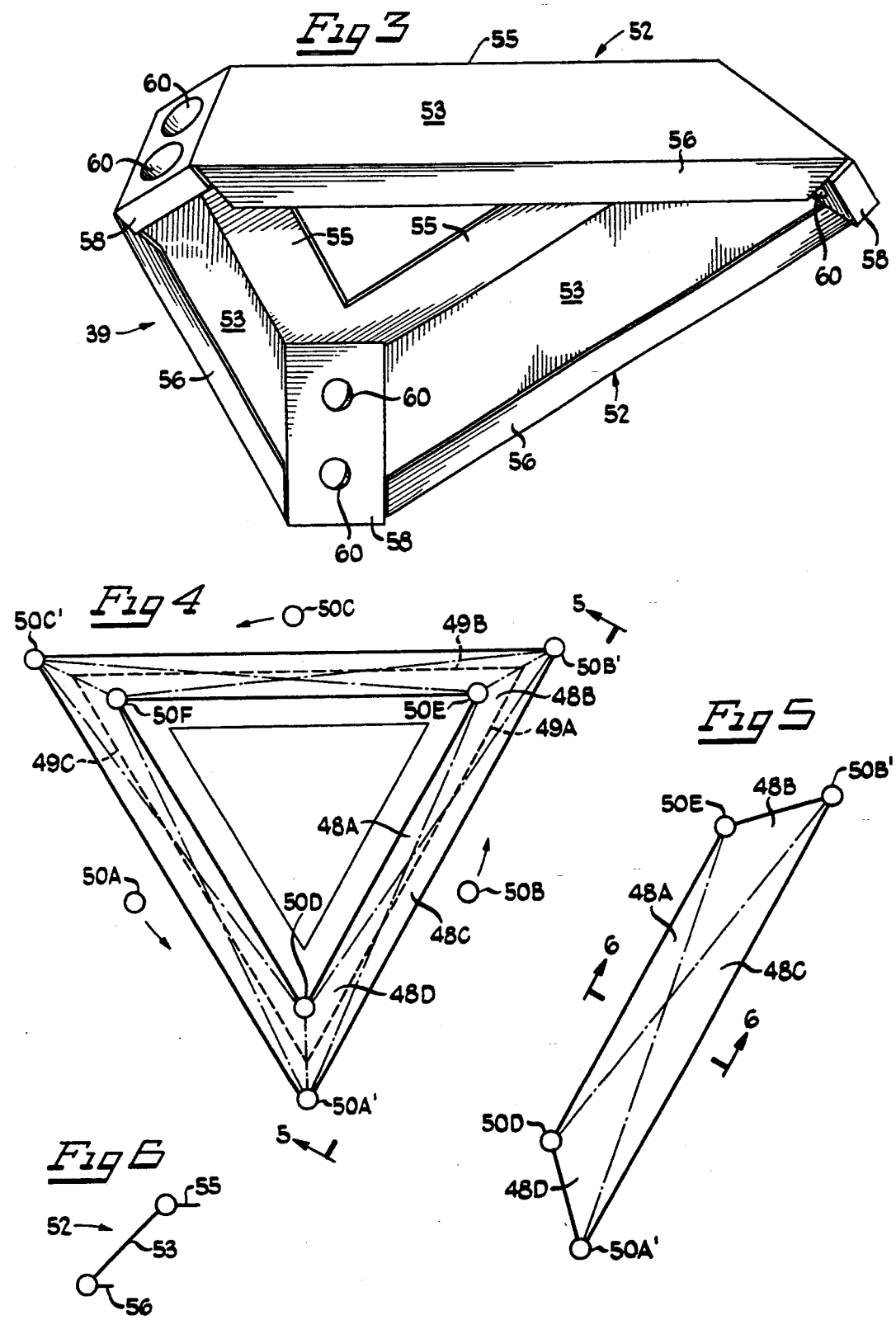

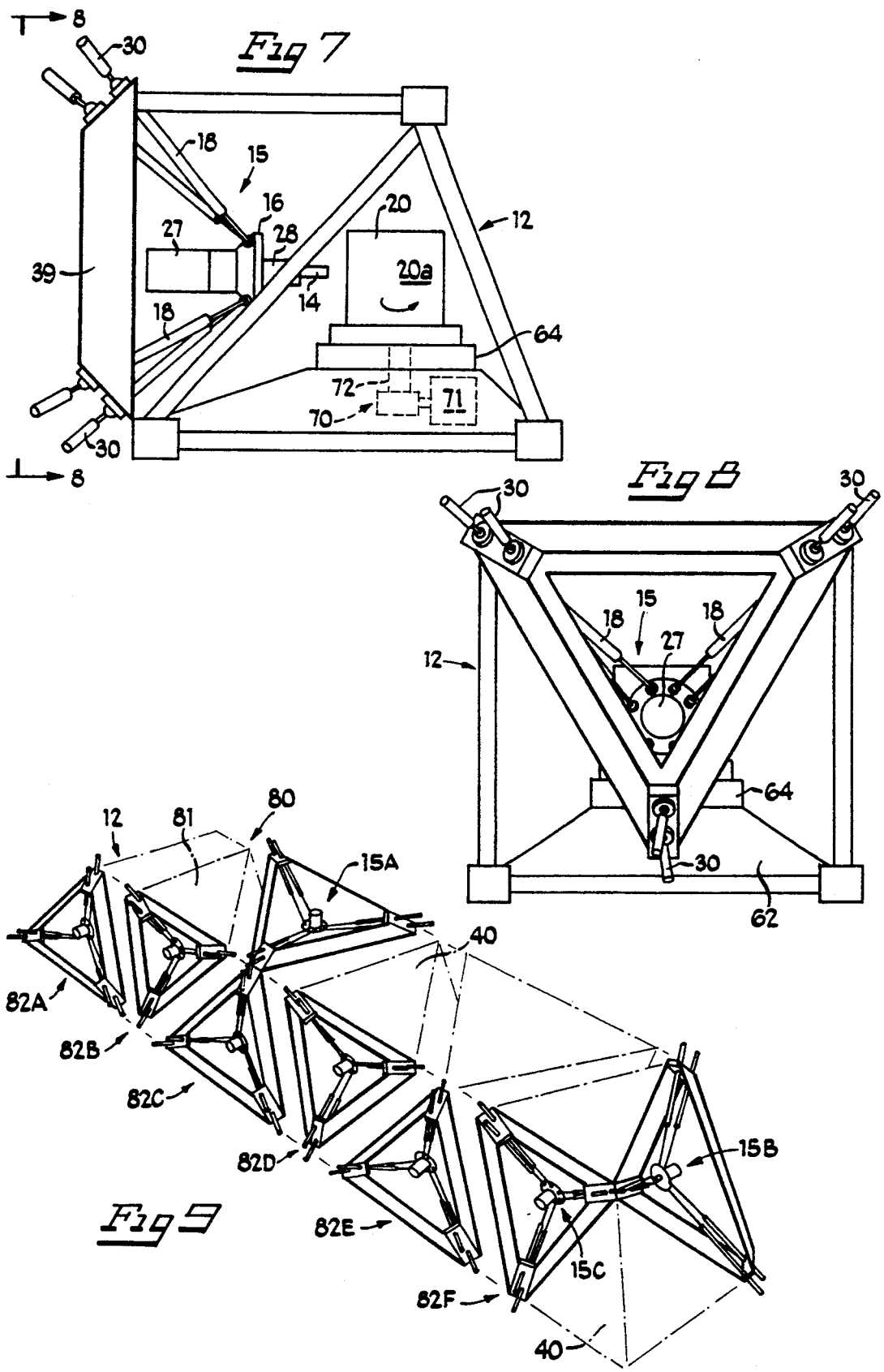

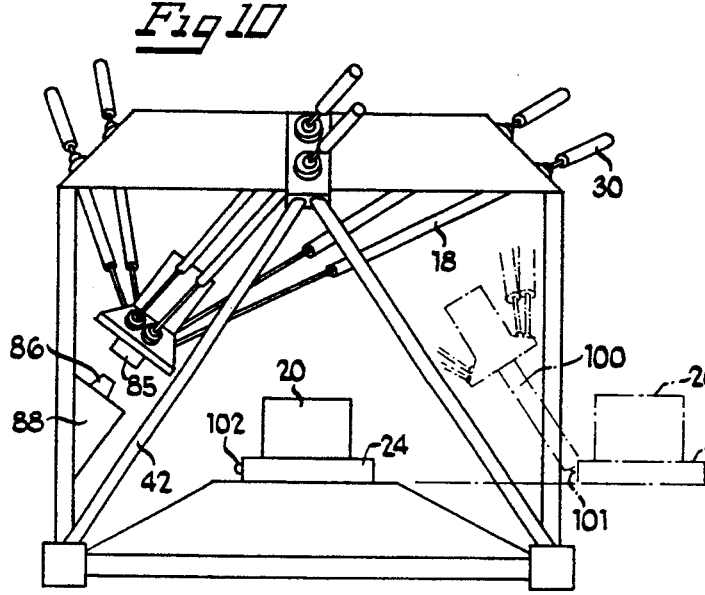
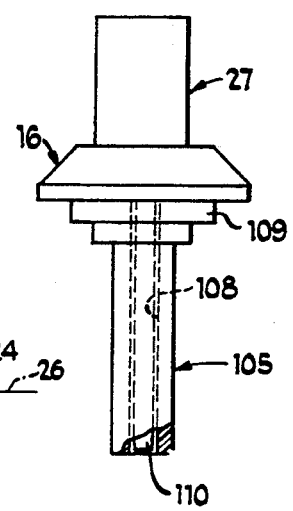
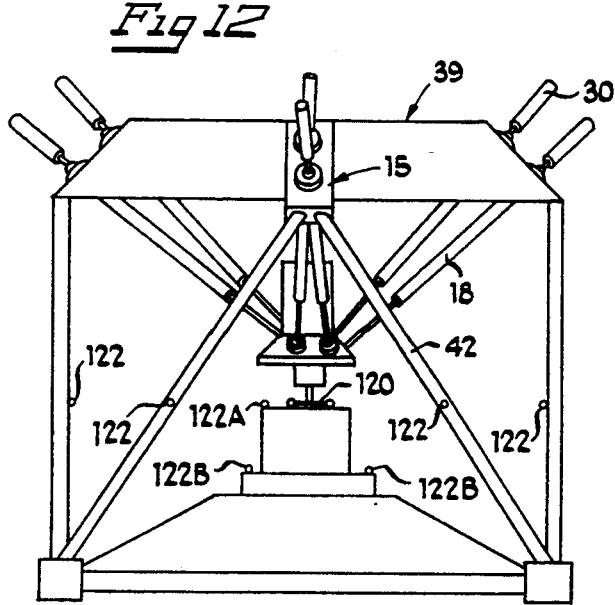
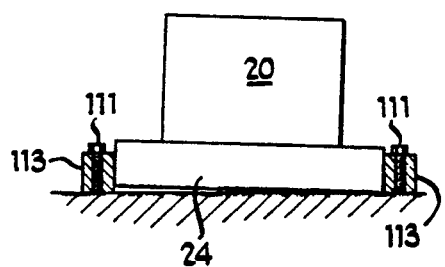

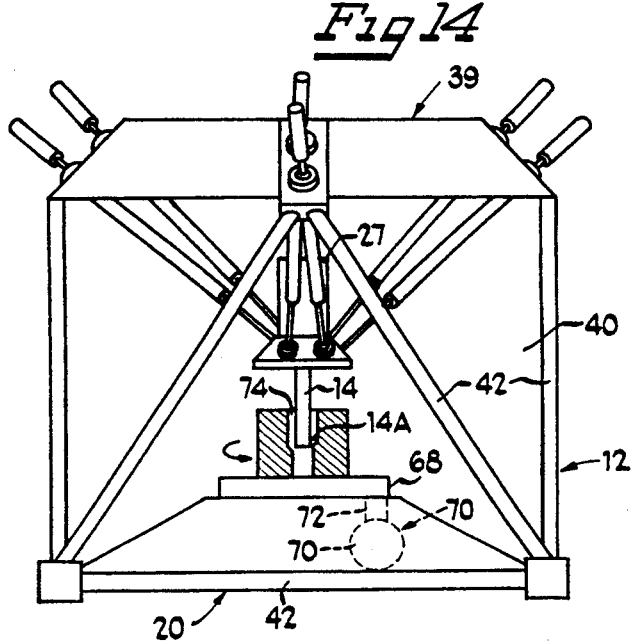
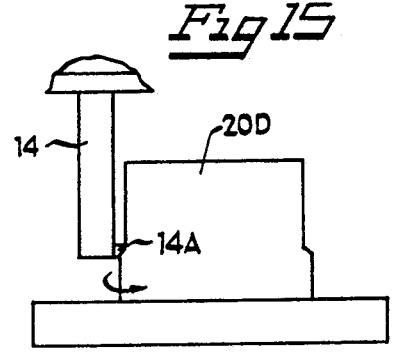
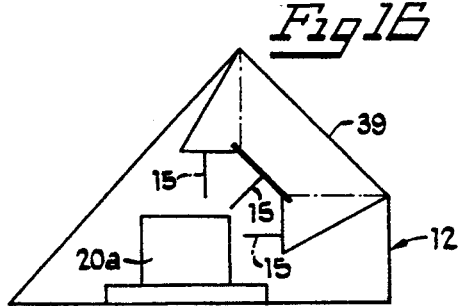
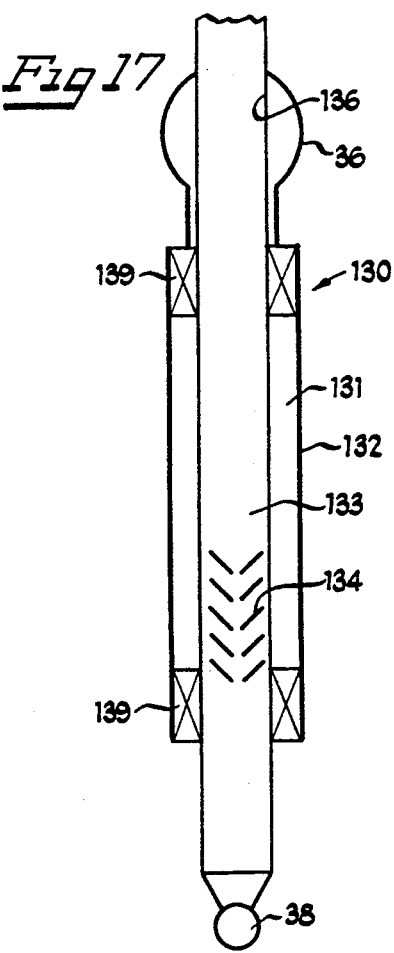
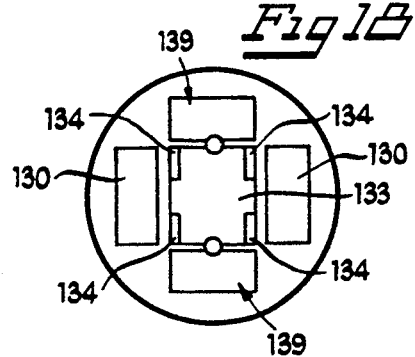

OCTAHEDRAL MACHINE WITH A HEXAPODAL TRIANGULAR SERVOSTRUT SECTION

This application is a continuation-in-part application of Ser. No. 749,582, filed Aug. 26, 1991, U.S. Pat. No. 5,259,710, entitled "Octahedral Machine Tool Frame".

BACKGROUND OF THE INVENTION

This invention is directed to machine tools and more particularly, to cutting machines and tools using a machine frame formed with an outer beam or strut framework with a tool mounted on servostruts for machining within the strut framework.

The above-identified patent application describes in detail the preferred strut framework formed of triangular sections or sides joined at six nodes or corners in the form of an octahedron. The present invention is not limited to an octahedron; but this is the preferred embodiment for reasons given hereinafter. The tool is mounted on a servostrut support, or platform, which has the outer ends of the servostruts connected by pivotal sockets and spherical heads to the nodes of a triangular section of the framework. The preferred servostrut support is a hexapodal strut platform or support often called a Stewart platform.

The combination of the hexapodal tool holder mounted on the nodes of the octahedral framework allows a precision economic machine that can machine hard metals to micron accuracies. The framework is preferably self-contained in that it needs no foundation for stability. It is also simple to build because it essentially is formed of eight, triangular sections or faces joined together at six corner junctions or nodes. A characteristic of the octahedron framework is that when forces are applied at its corners, there are no bending moments with all of the forces converted to axial ones in the strut-like members of the framework so that deflections are directly proportional to the lengths of the members and not the cube of their lengths; thereby providing a stiff structure with a minimum of framework material. For example, it is thought that a machine of this type can be built weighing only 40,000 lbs. versus a weight of 200,000 lbs. for a machine of conventional design. With such an octahedral framework, it should be possible to have a stiffness of 2,000,000 pounds per inch at the spindle, and a machining precision of one micron or less. The octahedron is one of the best ways to achieve maximum possible stiffness for a given mass of metal; and hence, is economical with respect to the amount of metal used for the machine frame.

With conventional orthogonal machines originally developed for manual control, if a straight line motion was required, the machine column, bed or tool slide was constructed to provide a straight line motion. For each of these straight line motions in the X, Y and Z directions, a different machine assembly was constructed and fitted to provide the straight line movement needed. Each of these machine assemblies had a different stiffness and they often were substantially different. Because of the open kinematic structure, the compliances or deflections due to each of the members are additive so that the overall machine stiffness is substantially less than that of its weakest members.

Another shortcoming of conventional five-axes machines is that the fitting and alignment procedures for initial set-up and for adjustment when parts begin to be out of tolerance is time-consuming and a basically manual operation. While errors in the X, Y and Z directions could be adjusted electronically or by servomotor controls, errors in pitch, yaw and roll about these respective axes could only be corrected manually with time-consuming adjustment, alignment, scraping, and special fitting techniques.

In conventional machines, under CNC control, complex machine motions are developed by driving machine elements along each of the X, Y and Z axes separately. Unlike these machines, the present invention uses a hexapodal platform that has six extensible and retractable struts, all of which must move simultaneously in parallel while sharing by the load in carefully coordinated moves. Adjustments for pitch, yaw and roll may be made by electronic offsets, in many instances, without the time-consuming manual and physical adjustments necessary for conventional, orthogonal cutting machines.

In developing the hexapodal platform and mounting it on a triangular panel of the octahedral framework, it has been found that it is not possible to locate both of the bearing mounts for the servostruts in a small corner block at a corner node of the octahedron; so that the forces from the struts would produce only axial-directed forces without bending moments. The remaining beams of the octahedron without these bearing mounts can be joined together in smaller, nodal corner blocks so that only axial forces are applied to each other without bending moments. While the pairs of bearing mounts for the servostruts are brought as close together as possible, these large, nodal corner blocks at the corners of the triangular servostrut section experience significant bending moments for certain movements of their associated servostruts, such as when one servostrut is pulling while the other servostrut is pushing. Thus, there is a need to overcome this problem of bending moments in the triangular servostrut section.

Another shortcoming of existing cutting machines is that a large amount of peripheral equipment is used with them to accomplish such tasks as tool changing, workpiece loading and unloading, and workpiece clamping and unclamping. While various equipment is provided to perform such tasks, for example, an automatic tool changer, such equipment adds considerably to the cost and size of the machine.

Also, present orthogonal machines usually require manual operators to calibrate or set-up the tool to within the desired tolerances and precision locations. Thermal changes, vibrations, wear or deflection of the tool, or other changing conditions with respect to the tool fixture, pallet or workholder may cause a part to be made out of tolerance. If such a part were out-of-tolerance after a rough cut and before a finish cut, or if such positional variations are detected before rough cutting, then the orthogonal machine could be recalibrated manually. Usually, without manual intervention, there is no practical way to recalibrate the orthogonal machine to assure that the part will be made to tolerance and no easy way for the machine itself to inspect the part to see that it is made to tolerance.

SUMMARY OF THE INVENTION

In accordance with the present invention, the triangular servostrut section of the framework is constructed to withstand bending forces, and to reduce the transfer of bending moments to the rest of the framework and to the base of the framework. Preferably, the triangular servostrut section is constructed with a virtual octahedral geometry inherent in the triangular section so that substantially only axial loads are transmitted from this section through its corners to adjacent framework sections. The preferred servostrut section for the framework has three hexapodal strut pivotal bearing mounts in a first triangular array located in a first plane and a three hexapodal strut pivotal bearing mounts in a second larger triangular array in a second plane parallel to the first plane. The preferred shaped for the framework beam for this triangular section is a tipped or angled plate having its edges reinforced by flanges projecting outwardly from the longitudinal edges of the angled plate.

The triangular servostrut section can be positioned in various locations on the tubular framework to provide different cutting machines, e.g., a vertical turret lathe when the hexapodal support section is positioned as a top or upper section of the framework with a lower base section of the framework supporting a rotating index table that rotates at a high speed to provide the surface cutting speed against a stationary tool extending downwardly to engage the rotating workpiece on the rotating table. On the other hand, the servostrut section may be placed in a substantially vertical position with the tool spindle projecting nominally along a horizontal axis to machine a workpiece in the manner of a horizontal machining center working on a workpiece that is turned by a vertically-oriented index table to bring each of the four sides of the workpiece in front of the spindle. In the case of when the tool is mounted vertically, as in a vertical turret lathe, a spindle drive can be carried on the platform to drive the tool to convert the vertical turret lathe type of machine to a machining center.

The triangular section carrying the hexapod struts can be mounted on various sides of the framework including opposite sides of a tubular framework to machine simultaneously on opposite faces of a workpiece. A transfer line tunnel can be created with a plurality of adjacent, tubular frameworks joined together in a manner to define a tunnel through which travels the workpiece from station to station along the tunnel. The preferred tunnel has its walls formed of a plurality of triangular servostrut sections each supporting a hexapodal platforms projecting inwardly into the tunnel to engage its tool with the workpiece. The hexapodal platforms may be bringing tools from opposite sides of the tunnel to engage simultaneously opposite vertical sides of the workpiece. An overhead triangular servostrut section may carry a Stewart platform with a tool projecting down into the tunnel to machine the top of the workpiece. The tunnel framework and the hexapodal servostruts provide an inexpensive way to build a transfer line.

A major advantage of the hexapodal support having the servostruts that are extendable and retractable and spherically mounted at opposite ends to a platform and to the triangular frame section is that the struts can be moved to position the platform at various angles so that the tool carried thereby can be presented to the workpiece at various angles, rather than at a horizontal axis only for a horizontal turret lathe or at a vertical axis only for a vertical turret lathe. These Stewart platforms working inside the octahedral framework allow more versatile positioning of the rotating axis of the tool to perform types of cutting not possible with a conventional vertical or horizontal lathe. Also, as previously explained, the six servostruts can be adjusted to offset or adjust electronically for errors in pitch, yaw and roll which cannot be done with conventional orthogonal cutting machines.

The preferred Stewart platform is a manipulator that, with proper extension and retraction of the servostruts, can be used in the nature of a robotic hand, particularly when used in connection with rotation of the tool about a sixth axis. One particular use of the Stewart platform as a manipulator as well as a tool support is the ability to automatically change tools without the use of a transfer arm of an automatic tool changer. That is, the Stewart platform can be maneuvered to position a tool over a toolholder and then turned by its spindle motor to unlock a tool. For example, a bayonet-type lock may be twisted and moved axially to release a tool and then brought into alignment with the next tool and manipulated by turning and push-pulling to bayonet lock the platform to this next tool which then can be swung to engage and begin to machine the workpiece.

The ability of Stewart platform to be used as a manipulator may also be used to load and unload a workpiece into and from a workholder. For instance, if the workpiece is carried on a pallet with a special connection such as a ball on the end of a universal stick, the ball may be gripped by the Stewart platform and pulled to remove the workpiece from the workholder; and in a reverse manner, the special connection may be made with the next pallet and the Stewart platform may be moved to pull the pallet and workpiece thereon into the workholder. A workholder clamping and unclamping mechanism can also be manipulated by this Stewart platform to clamp or unclamp the workpiece and/or pallet. The use of the Stewart platform as a manipulator particularly with the use of the sixth rotational axis when locking or unlocking with a twist motion provides a versatile machine with capabilities requiring numerous and more expensive mechanisms in conventional machines.

The Stewart platform can be swung to various locations and also can be used to calibrate or recalibrate itself and to inspect its own machining. More specifically, benchmarks may be placed on the machine struts, a work support or fixture and/or the workpiece. The Stewart platform can be manipulated to grasp a contact or non-contact probe that can be swung to a benchmark and the position can be read and compared internally by software with the stored position coordinates for the benchmark. Thus, subsequent to one machining operation and prior to the next machining operation, the position of the tool and spindle relative to the benchmark can be measured; and, if necessary, the servostruts can be repositioned to recalibrate the tool to the desired coordinates. On the other hand, if the workholder and the workpiece were tipped at a given angle, the angle and degree of tipping could be measured, and the servostruts could be adjusted, and the software reset to provide a new cutting path based on the axis of the tipped workpiece. Parts can likewise be inspected by a probe carried by a hexapodal manipulator which first checks its calibration with the benchmarks; and, then when recalibrated, is moved to the workpiece to inspect the same. By first recalibrating with the benchmarks, any tool deflection or wear can be detected, and accounted for, before inspecting the workpiece to eliminate a bad inspection because of movement or wear occurring during the machining of the workpiece.

The servostruts may be formed as linear motors to reduce the overall length of the strut and to provide control of movement inherent with a linear motor.

Accordingly, a general object of the invention is to provide a new and improved triangular section for mounting a hexapodal platform for machining a workpiece.

Another object of the invention is to provide unique combinations of frameworks and hexapodal platforms to perform machining at various angles.

Another object of the invention is to provide a Stewart platform in combination with an octahedral framework with the Stewart platform used not only as a toolholder and/or spindle mount and drive, but also as a manipulator for additional operations such as loading and unloading a workpiece, clamping and unclamping a workpiece in a toolholder, inspection of a workpiece or calibration of the machine.

BRIEF DESCRIPTION OF THE DRAWINGS

These and other objects and advantages of the invention will become apparent when taken in conjunction with the following detailed description and drawings in which:

FIG. 3 is a perspective view of a triangular servostrut section constructed in accordance with the preferred embodiment of the invention;

FIGS. 4, 5 and 6 are diagrammatic illustrations of how a virtual octahedron is incorporated into the triangular servostrut section of FIG. 3;

FIG. 7 illustrates the cutting machine used as a horizontal machining center;

FIG. 8 is an end elevational view of the machine shown in FIG. 7;

FIG. 9 is a diagrammatic illustration of hexapodal platforms and triangular servostrut sections used in a transfer line tunnel configuration;

FIG. 10 is an illustration of the hexapodal platform doing a tool-changing operation and the loading and unloading of a workpiece;

FIG. 11 is an elevational view of a tool bar used to clamp and unclamp workpieces in a workholder;

FIG. 12 illustrates the hexapodal platform using a probe and benchmarks to inspect workpieces and to calibrate the machine;

FIG. 13 illustrates clamping a workpiece and showing a tilted workpiece;

FIG. 14 is a view of a vertical turret and a vertical machining center;

FIG. 15 is a view of a vertical turret tool cutting an outer diameter;

FIG. 16 is a diagrammatic illustration of an irregular octahedron frame with the triangular hexapodal section at 45°;

FIG. 17 is a cross-sectional view of a servostrut in the form of a linear motor; and FIG. 18 is a cross-sectional view of a linear motor servostrut.

DETAILED DESCRIPTION OF THE PREFERRED EMBODIMENT

Figure 1:
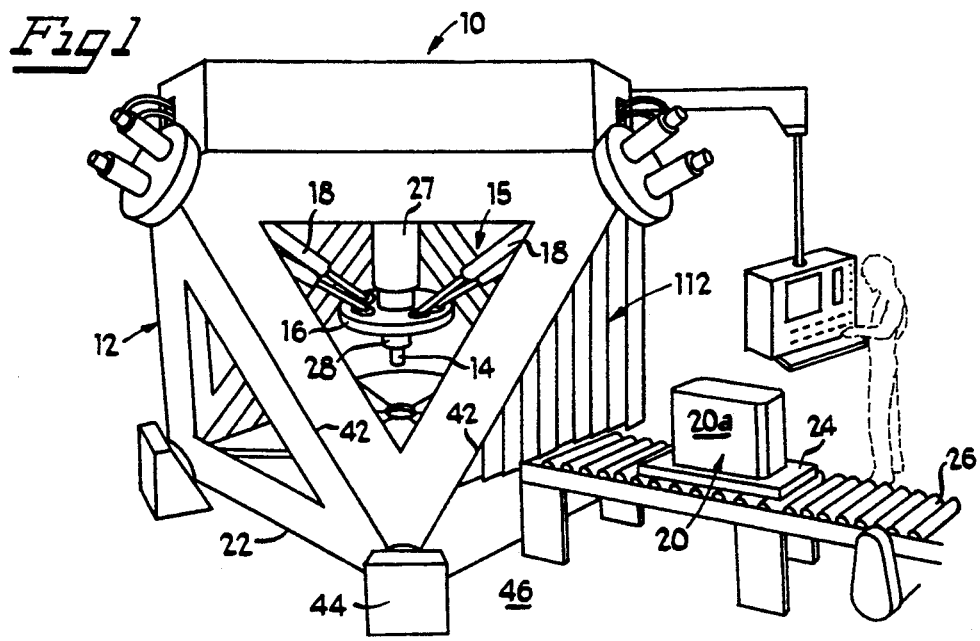
FIG. 1 is a perspective view of a cutting machine having an octahedral frame and a hexapodal platform constructed in accordance with the present invention.

As shown in the drawings for purposes of illustration, the invention is embodied in a cutting machine 10 having a framework 12 within which is a tool 14 carried by a servostrut support 15 having a platform 16 mounted on extendable and retractable struts 18. The tool will engage workpiece 20 mounted on a table 64 carried on a base section 22 of the framework. The workpiece may be mounted on a pallet 24 mounted on a conveyor 26. The tool may be driven as in a milling cutter or it may be a stationary tool as a fixed lathe point. In FIG. 1, the tool is driven by a drive means in the form of a motor 27 and spindle 28 mounted on the platform and shiftable with the extension of some struts and retraction of other struts. The illustrated struts are servostruts having servomotors 30 mounted at ends of the struts to turn an internal screw within a nut which causes a smaller rod 32 to telescopingly move within the upper, larger tube 34. The preferred and illustrated servostrut support is a Stewart platform which is a hexapodal servostrut and platform having six struts with the upper ends of the struts pivotal mounted in pivotal joints 36 which are preferably ball joints with a spherical sweep. The inner ends of the struts are connected by ball joints 38 having spherical seats in the platform.

The preferred framework 12 is formed of triangular sections 40 each having three struts or beams 42 joined at corners by nodes or nodal connecting members 44 in the form of thick blocks. The preferred and illustrated framework is an octahedron which has eight triangular sections 40 with a base section 22 resting on a floor 46 or the like. A main feature of an octahedron framework 12 is that bending movements are not transmitted through the corners or nodes 44. Where the tubular members 42 are joined at a small nodal blocks 44, such as for the lower end of the machine of FIG. 2, there are no significant benching movements transferred between the tubular members 42. However, the upper servostrut section 39 has large nodal blocks 58 to accept and carry the pair of ball joints 36 for the pair of servostruts. There is no way that the ends of the tubular members 42 can be joined at a small node at the servostrut section 39 as the tubular members 42 can be joined with the other sections 40 or the base section 22. The base section 22 and upper section 39 and six other sections 40 are all joined to form an octahedral framework 12 in FIG. 2. Additionally, the servomotors 30 projecting from these ball joints 36 must all be free to pivot without hitting one another. The axially-extending, hexapodal struts 18 exert axially-directed forces to spaced locations on the attached nodal blocks 58. Particularly, when one adjacent strut is pulling on the nodal block and the other adjacent strut is pushing on the same nodal block bending moments can be induced in this nodal block which bending moments can be transmitted through attached framework sections 40 to the base section 22. In such an event, the stiffness may be reduced and deflections may occur, thereby limiting the precision of the machining by the cutting machine 10.

In accordance with the present invention, means are provided to limit transfer of bending moments and to reduce deflections from the servostrut section 39 to the other connected sections 40, and particularly, to the base section 22 that carries the workpiece. In the preferred embodiment of the invention illustrated and described in connection FIGS. 3-6, this is achieved by adding a virtual octahedron into the servostrut section 39 so that there are virtual triangular sections 48A-48D, as shown by dotted lines in FIGS. 4 and 5, within each of the three wells of the section 39. The virtual octahedron is an irregular octahedron that had its virtual corners or nodes 50A-50C outside of plates or walls 52 of the servostrut section 39. This virtual octahedron is formed by the various dotted lines 49A, 49B and 49C, which were connected to form the virtual octahedron which was then rotated as shown by the arrows "A" so that the virtual upper and lower octahedral nodes 50A, 50B and 50C were located beneath and outwardly of nodes 50D, 50E and 50F respectively. These new locations of the rotated nodes are designated 50A$^1$, 50B$^1$ and 50C$^1$. These nodal locations result in a series of virtual triangular sections such as virtual triangular 48A, 48B, 48C and 48D, as shown in FIG. 5, for each of the three walls 52 of the servostrut section. While it would be possible to weld tubes to form all of virtual triangular sections 54A–54C so that the virtual octahedral shape within the servostrut section could be seen, it is preferred to provide solid metal plates 53 projected at angle, herein at 45°, as shown in FIG. 6, that will be in the path of and hence contain all of the virtual octahedral sections 54A–54C and the six nodes 50A$^1$–50C$^1$ and 50D–50F. Additionally, it has been found that the stresses tend to concentrate along the edges of the plates 53 and herein the plates 53 are reinforced along the edges and strengthened. To this end, a laterally-projecting upper flange 55, and a lower laterally-projecting flange 56 are added along the sides' edges of the plates 53 to form the completed walls 52 for the servostrut section 39, as best seen in FIG. 3. Metal nodal blocks 58 are welded to the walls and project at the same 45° angle as the plates 53, and will support the strut pivotal mounts 36 each of which includes a spherical ball joint seat 60. The nodal blocks 58 are connected at the three corners to beams 42 of the other sections 40.

The ball joint seats 60 of the strut pivotal mounts 36 are located at the nodal points 50 of the virtual octahedron described in connection with FIGS. 4–6. Thus, when bending moments are applied by the struts 18 to the pivotal mounts or joints 36 in the section 39, the virtual octahedron within the section walls 52 is sufficiently strong to withstand the high forces imparted thereto. Of course, an equal and opposite reaction force at the cutting tool 14 is being imparted to the workpiece 20, and from the workpiece to the triangular base section 22. Both the base section 22 and the servostrut section 39 are connected to beams 42 of the other triangular sections 40 that extend vertically between the upper section 39 and base section 22. The beams 42 illustrated in FIG. 2 are hollow tubes which are bolted or otherwise secured at opposite ends to nodal blocks 58 at their upper ends and to nodal blocks 44 at their lower ends.

The addition of a virtual octahedron into the triangular servostrut section 39 is the preferred means for resisting bending moments applied by the hexapodal struts and thereby, limiting the transfer of bending moments from this servostrut section 39 to remainder of the framework sections, and in particular, the work supporting base section 22. Another means for accomplishing this same function has been developed, but not illustrated herein, and it involves the addition of a tetrahedron framework to the octahedral framework 12. More specifically, the additional tetrahedron framework was formed by connecting an additional beam, e.g., at a top end to a horizontal nodal member 58 that extended horizontally outward of the octahedral node in the triangular section 39. In this horizontal nodal block, both of the pivotal mounts 36 are disposed side by side, that is, horizontally in the same plane. This additional tetrahedral beam was joined to this large horizontal nodal block 58 near a ball seat 60 and extended down to the lower nodal block 44, and was fastened thereto. Thus, a new triangular section was formed and defined the adjacent octahedron beam 42, the new tetrahedral beam and the portion of the nodal block 58 extending between the top ends of these two beams. A similar beam was added to the other side of the large nodal block 58 adjacent the other ball seat 60 and extended down to the same lower nodal block 44 to create a second triangular section having the same octahedron beam 42 as a common member side for both of the triangles. A similar structure was formed at each of the other two nodal blocks 58 each having two ball seats 60 disposed adjacent each other in the same horizontal plane. Other beams were added in the horizontal plane of the top section 39 from the ends of the large nodal blocks to adjacent nodes. Because of the intersection of the tetrahedron beams with the octahedral beams these intersecting beams (or closely adjacent beams) were joined together into a common plate so that the tetrahedral structure was a virtual tetrahedral structure with common plates.

Figure 2:
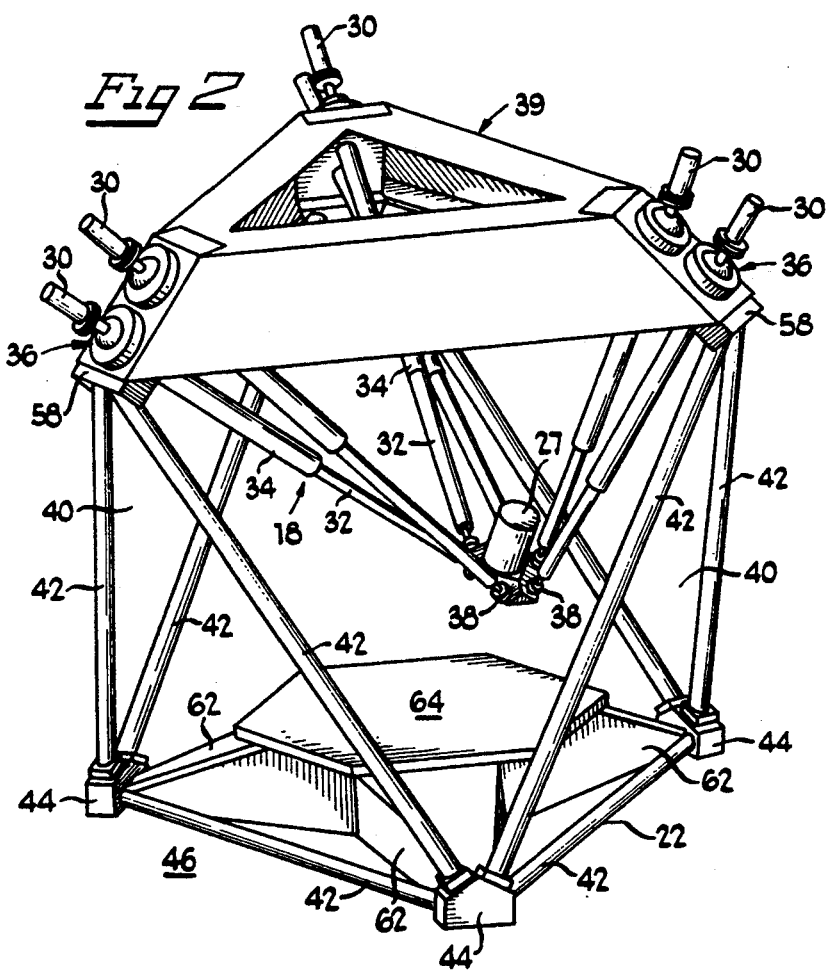
FIG. 2 is a perspective view of a cutting machine with an octahedral framework and a triangular servostrut section supporting a hexapodal platform.

In FIG. 2, the strut-supporting section 39 is shown in a generally horizontal position at the top side of the octahedron with the tool 14 pointing downwardly to rotate about a nominally vertical axis when driven by the spindle motor 27 on the platform. The cutting machine described herein may be used in the manner of a horizontal machining center, as illustrated in FIG. 7, in which the servostrut section 39 is positioned generally vertically with the tool 14 projecting at a nominal horizontal axis to cut a vertical side 20a of the workpiece 20. When all of the struts are at equal length, the spindle axis will be horizontal and perpendicular to a vertical axis about which the index table 64 is turned by an index table drive 70 having a motor 71 and gear and shaft mechanism 72. By rotating the index table, each of the sides of the workpiece 20 may be presented to the tool for machining. Angles which fall in a vertical plane may also be milled by manipulating the struts 18 to shift the tool axis. The Stewart platform provides more flexibility in machining at various angles because the spindle motor 27 and spindle 28 can be shifted to various angles, whereas a conventional horizontal machining center has its spindle axis only horizontal. The horizontal cutting machine can be manufactured for less cost than a conventional horizontal machining center because it has less mass and metal in it. The largest mass is in the index table and the base section to rotate and to support the workpieces in the machine of FIG. 7.

As described in the aforesaid co-pending patent application Ser. No. 749,582 of Paul Charles, the base section 22 (FIG. 2) supports a central worktable that has three radiating legs 62 having their inner ends joined to worktable plate 65 and their outer ends joined to nodal blocks 44 of the base section. This co-pending patent application is incorporated by reference in this application as if fully reproduced herein. Herein, the legs are each of a truncated shape having a larger and thicker cross-sectional end connected to the worktable plate 65 and smaller end connected to the nodal block. These legs function in the manner of the elliptical cones used for legs 62 described in the aforesaid patent application, and for the reasons described therein.

The cutting machine may also be used as a replacement for a vertical turret lathe, as will be described in connection with the illustrations in FIGS. 14 and 15. In a typical vertical turret lathe, the tool 14 is held stationary on a vertical axis, and an index table 68 of large mass is rotated at high speed by an index table drive 70 including a motor 71 and a gear box unit 72 to drive the index table to provide the workpiece with the surface speed necessary for cutting. Herein, the tool 14 is shown with a cutting insert 14A projecting radially outwardly from the tool to cut an internal bore 74 within the workpiece, as shown in FIG. 14. In FIG. 15, the tool 14 has a stationary point insert 14A cutting on the outer diameter of a circular workpiece 20D as the index table rotates the workpiece at high speed.

While the vertical turret lathe uses a stationary tool, it is possible to add a motor-driven spindle drive having the motor 27 mounted on the platform 16 to rotate a cutting tool such as a mill or a drill during which cutting the index table 68 will be stationary. Thus, there can be provided a hybrid machine that can function as either a vertical machining center, when the spindle motor 27 is rotating the tool to provide the necessary surface speed for cutting, or a vertical lathe when the cutting tool is held stationary and the index table rotating at a high speed to provide the necessary surface speed for cutting with the stationary tool. The height of the vertical machine shown in FIG. 14 can be varied or proportioned to a customer's needs by merely changing the length of the upright beams 42 for the side sections 40 between the bottom base section 22 and the top servostrut section 39. While not illustrated, it is also possible to make this vertical machine into a more complete machining center by adding a second Stewart platform and a second servostrut section 39 with the latter being mounted vertically so that there is an additional cutting tool spinning about a nominal horizontal axis and driven by a motor rotating the spindle about a nominal horizontal axis. Thus, there will be one Stewart platform having a tool rotating about a vertical axis and a second Stewart platform having a tool rotating about a horizontal axis to mill simultaneously on the top and sidewalls of the workpiece. Both of these vertically and horizontally rotating tools may be moved through substantial changes in position to place their respective cutting tools to make cuts at various angles to its respective nominal rotational axis.

The servostrut section 39 and its Stewart platform are readily adapted to be used in an elongated framework 12, which may be, as shown in FIG. 9, in the shape of an elongated tunnel 80 having a hollow central passageway 81 through which the workpieces, which are usually mounted on fixtures or pallets, travel from cutting stations 82A–82F. At each cutting station is at least one Stewart platform with a spindle drive means including a motor 27 turning a cutting tool 14 projecting inwardly into the hollow interior of the tunnel from a vertical tunnel section 40 or from a top tunnel section 40. As best seen in FIG. 9, a Stewart platform 15A may be provided in the top tunnel section 39 at cutting station 82C to cut on the top face of the workpiece while another Stewart platform 15C is cutting the left side of the workpiece. At station 82F, the opposite vertical sides of the workpiece are being cut simultaneously by tools mounted on the Stewart platforms 15B and 15C. The tunnel provides convenient maintenance because all of the tools, motors and struts are on the outside of the tunnel at convenient locations. The transfer tunnel provides a very flexible transfer machine because the Stewart platform allows holes to be drilled at different angles. Also, as will be explained, the transfer line could be used to machine certain parts and then quickly changed over to machine different parts by having the Stewart platform act as manipulators to change its own tools to those tools needed for the next parts to be machined. This tunnel transfer machine can be used to machine on five axes and to machine simple and compound angles. The framework can be in the form of octahedrons or in other tubular shapes and configurations having various triangular sections 40. The servostrut sections 39 on the tunnel transfer machine are similar to those described in connection with FIGS. 3–6. The preferred construction uses modular construction with ears on each module projecting toward its neighboring adjacent module. By connecting the ears together, the modules may be aligned along a straight line with the work traveling down a straight axial line through the hollow tunnel. Relatively, little foundation work is needed for the tunnel transfer line as compared to a current conventional transfer line using conventional milling machines. This is true of all of the cutting machines 10 herein described in which the base section 22 may be rested on the floor 26 without the need for a large foundation, as described in the aforesaid patent application.

In a still further embodiment of the invention shown in FIG. 16, the octahedral framework is irregular with the servostrut section 39 disposed at 45° and with the Stewart platform having a tool 15 located along a nominal 45° axis. This type of irregular octahedral framework is designed to allow the tool 15 to swing to both a near vertical and a near horizontal position so that the same tool can be used to do both a vertical axis and a horizontal axis machining operation. The included angle of the illustrated ball joints 36 is 60° which means that the tool can only be swung about 30° toward the vertical or 30° toward the horizontal. The remaining 15° can be obtained by tilting the index table through 15° to bring the top face of the workpiece perpendicular to the tool 15 when it is only 15° from the vertical. By tilting a facing vertical side of the workpiece up at 15° by the canting the index table, the tool 15, when at 15° to the horizontal will be perpendicular to the side wall 20a and capable of machining along a horizontal axis through this tilted vertical workpiece sidewall 20a. Alternatively, ball joints can be replaced by three auxiliary universal joints having more than a total of 90° rotational tilt.

The Stewart platform 15 has its five axes and has an additional sixth axis in the sense that the entire platform 16 can be rotated through about 30° coaxially about the spindle and tool axis. This sixth axis rotation is particularly useful is using the Stewart platform to be used as a manipulator to change its own tools, load or unload work, clamp or unclamp workpieces in a workholder, calibrate the machine, and/or inspect workpieces.

The tool gripping mechanism 85 (FIG. 10) may be actuated to grip a conventional conical toolholder 86 to remove a tool from a rack 88 of tools. The tool rack 88 could be either stationary or on a movable chain or belt carrying a plurality of tools to the tool transfer station. The toolholders each carry a specific tool such as a milling cutter, drill, etc. and the toolholders can be provided with a twist locking connection as well as a push or pull locking connection. The servostruts 18 can be adjusted to align the tool gripping mechanism 85, as shown in FIG. 10 with a toolholder 86 and then the conical end of the toolholder. The entire platform 16 could then be rotated up to about 30° to twist lock, e.g., with a bayonet-type lock, the toolholder shank to the tool gripper. The toolholder and its attached tool then may be swung back to the nominal vertical axis position and the spindle motor turned to do the machining on the workpiece 20. In other embodiments of the invention, the outer housing of the tool is non-rotatable and carries its own internal spindle. The rotation of the tool gripping mechanism about the sixth axis can be used to lock and load this internal spindle-type tools also.

The sixth axis may also be used as a manipulator to shift a tool bar radially outward. For example, if the tool bar is eccentrically mounted, a rotation thereof by the sixth axis movement of the Stewart platform can shift the tool point outwardly of the rotational axis of tool to make larger cuts. Of course, a reverse eccentric movement could move the cutting point inwardly to cut at other locations. A tool cartridge could also be adjusted by utilizing the sixth axis rotation of the Stewart platform for tool adjustment.

Another manipulator function of the present invention is to load and unload workpieces 40. One manner of doing this is to provide a manipulating bar or stick 100 (FIG. 10) with a universal joint 101 at one end which can be engageable and connectable in a socket 102 on a tool carrying pallet 24. The tool gripping means on the platform can be used to grip the upper end of the bar 100 and maneuver to insert the universal joint 101 into the socket; and then by adjusting the servostruts, the pallet and workpiece thereon can be rolled across the conveyor 26 from the rotating index table to the position shown in phantom lines in FIG. 10. A new pallet with a new workpiece is then engaged by the bar and pulled along the conveyor and onto the index table.

The workpieces may also be clamped and unclamped a workpiece by the Stewart platform 15. For instance, as diagrammatically shown in FIG. 11, a screwdriver shaft 110 in the middle of a tool bar 105 may extend upwardly to the spindle 109 through a central axially located bore 108 in the tool bar to be driven by the spindle motor separately from the tool bar. The screwdriver shaft 110 may be brought into engagement with the upper ends of actuating screws 111 (FIG. 13) on a clamping mechanism of a workholder to twist or screw the actuating screws through as many revolutions as needed to clamp or unclamp the workpiece. Alternatively, if only a small arcuate movement is needed, the entire hexapodal platform 15 could be rotated about the sixth axis to rotate the screw 111 to actuate the mechanical clamping mechanism 113 to clamp and unclamp pallet 24 and/or workpiece 40 thereon to and from the workholder.

The preferred sections 40 are covered by walls 112 (FIG. 1) which will contain the chips and coolant within the framework 12 during machining. At least one of the walls 112 will have a door which will be opened to load and unload workpieces and thereafter closed. Again, the manipulator can be given a bar to turn or push a door actuator to move the door to its open and closed positions.

Another preferred manner of usage of the Stewart platform and the framework 12 is to have the machine calibrate itself before or after a machining operation. This involves the tool gripping mechanism grasping a contact or non-contact probe 120, as best seen in FIG. 12. The framework 12 may carry a plurality of spaced benchmarks 122 and benchmarks 122A may be placed on the part and benchmarks 122B may be placed on the tool pallet or fixture. Prior to machining or after finishing one operation much as a rough cut and prior to making a finish cut, the probe 120 may be grasped by the tool gripping mechanism and moved to contact the benchmarks and the coordinate positions for the tool, fixture and workpiece may ascertain and compared with stored coordinates to see if there is a need for recalibration before doing the next operation. Likewise, the probe 120 may be used to inspect the workpiece to identify its dimensions and positions and to check for deviations due to angular errors or deflections. By recalibrating to eliminate errors due to deflections, etc and then inspecting the workpiece, the workpiece will have been inspected with a probe from which has been eliminated the errors or deflections that would otherwise not be accounted for or recognized except for this ability to auto-recalibrate. The ability to recalibrate and re-zero the machine in the X, Y and Z axes and for pitch, yaw and roll axes allows the correction for different kinds of errors due to, e.g. thermal build up in one part of the machine causing it to deflect, machine wear, the portion of the workpiece is tipped or skewed. As previously explained, in conventional orthogonal machines, it is possible to use a servodrive to offset for errors in the X, Y and Z axes; but for each of these axis, there may be an offset needed for correction in the pitch, yaw or roll axes which can only be corrected manually with considerable time and effort. With the hexapodal platform 15, each of the six servomotors may be electronically adjusted electronically to correct, in many instances, for errors that would correspond to deviations in pitch, yaw and roll. If the position of the workpiece is found to be tipped or skewed, as illustrated in FIG. 13, it is possible to readjust the machine coordinates to that of the tipped part and to machine the part as though it were not tipped.

Another aspect of the machine tool 10 is that the Stewart platform may be tilted to shift different tools into engagement with the workpiece by adjustment of the servostruts. The platform may have a motor drive for a spindle carrier plate having a three spindle head. Each spindle may have a drill, reamer, chamfering tool or the like with tools splayed out at angles to the nominal axis. By tilting the spindle head by about 15°, for example, one tool could be aligned to machine the workpiece while the other two tools are tilted to positions free and clear of the workpiece. By successive tilting of the platform 16, the other two tools can machine one at a time without interference from the remaining two tools.

In the aforesaid patent application, servostruts 18 are described in detail as having a lower smaller diameter rod 32 that is extendable and retractable in an outer strut tube 34 with a ball and screw in the strut tube. The servomotor 30 is connected to and rotates a central screw that extends into the strut rod that carries a non-rotatable nut. The strut rod is not rotatable relative to the strut tube so that turning of the internal screw either extends or retracts the rod. In accordance with this invention, the servostrut may be made without a ball and screw and with a linear motor 130 (FIGS. 17 and 18). The linear motor may have a stationary stator 131 in an outer cylindrical housing 132 with an internal rod 133 carrying magnet armature pieces 134 in a herringbone pattern. The armature rod 133 may extend through an opening 136 in a spherical mounting upper ball joint 36 which fits in a mating socket in a nodal block 58. Because the rod 133 is smaller in diameter than the diameters of the servomotors 30 for driving the lead screw, the adjacent rods 133 at adjacent nodes may be positioned closer to each other which is desired to reduce bending movements. The length of the servostrut is also reduced because there is no servomotor on the end of the tube but instead the linear motor housing 132 surrounds the rod 133 and is located below the upper ball joint 36. A lower ball joint 38 is formed on the lower end of the rod 32 to mate in a socket on the platform 16. While it would be preferred to have the strut rod 133 with a circular cross-section, current technology dictates use of a square cross-section strut rod 133 (FIG. 18). The square rod (FIG. 18) has two stator portions 130 with one facing each side of the rod having the armature magnets 134 therein. Suitable bearings 139 on the housing 132 mount the strut rod for sliding movement. It has been found that with appropriate electrical controls, faster and more accurate positioning control can be achieved by a linear motor than can be achieved with a lead screw and nut and without the use of mechanical anti-backlash devices used with lead screws. Hence, there are significant advantages to using a linear motor servostrut over the conventional lead screw and nut strut commonly used with Stewart platforms.

What is claimed is:

1. In a machine for cutting a material, the combination comprising:
   a framework;
   a movable platform for carrying a tool;
   hexapodal struts pivotally connected at one end to the movable platform and sharing the cutting load from the tool;
   a triangular shaped support section on the framework having six pivotal mounts for supporting the other ends of hexapodal struts and allowing pivotal movement thereof, two of the pivotal mounts being spaced apart and located at each corner of support section;
   means for resisting bending moments from support section to the framework; and
   a triangular base section supporting the workpiece being machined and determining the overall size of the machine, the size of the triangular support section determining the overall capability of the struts.

2. A method of machining comprising:
   providing a framework with opposed sides and a bottom side defining a hollow interior having a workholder in the hollow interior;
   moving a workpiece into the hollow interior and putting the workpiece on the workholder;
   manipulating a Stewart platform by moving extendable and retractable struts to move a tool to engage the workpiece on the workholder;
   machining the workpiece by relative surface movement between the tool and the workpiece; and
   transferring axially-directed loads along the struts to a pair of spaced pivotal mounts at each corner of a triangular section of the framework and limiting the transfer of bending moments to the remainder of the machine frame from the triangular frame section supporting the struts.

* * * * *